United States Patent [19]

Pedersen

[11] Patent Number: 4,737,886
[45] Date of Patent: Apr. 12, 1988

[54] METHOD AND APPARATUS FOR ELECTRICALLY ALTERING PROPERTIES OF A COLLOIDAL SUSPENSION CONTAINING ELONGATED FIBROUS PARTICLES

[75] Inventor: Norman E. Pedersen, Newburyport, Mass.

[73] Assignee: Panametrics, Inc., Waltham, Mass.

[21] Appl. No.: 795,105

[22] Filed: Nov. 5, 1985

[51] Int. Cl.$^4$ .............................................. C09K 3/00
[52] U.S. Cl. .................................... 361/225; 252/73; 252/74; 252/76; 252/78.1; 350/391; 181/260; 181/296
[58] Field of Search ............................ 252/73–76, 252/78; 361/225, 233; 350/391; 181/260, 291

[56] References Cited

U.S. PATENT DOCUMENTS

| | | | |
|---|---|---|---|
| 2,417,850 | 3/1947 | Winslow | 175/320 |
| 3,040,625 | 6/1962 | Zito, Jr. | 350/391 X |
| 3,047,507 | 7/1962 | Winslow | 252/75 |
| 3,367,872 | 2/1968 | Martinek | 252/74 |
| 3,385,793 | 5/1968 | Klass | 252/75 |
| 3,397,147 | 8/1968 | Martinek | 252/78 |
| 3,412,031 | 11/1968 | Martinek et al. | 252/75 |
| 3,427,247 | 2/1969 | Peck | 252/75 |
| 3,655,267 | 4/1972 | Forlini | 350/391 |
| 3,970,573 | 7/1976 | Westhaver | 272/73 |
| 3,984,339 | 10/1976 | Takeo et al. | 252/74 |
| 4,025,163 | 5/1977 | Saxe et al. | 350/391 X |
| 4,033,892 | 7/1977 | Stangroom | 252/76 |
| 4,129,513 | 12/1978 | Stangroom | 252/76 |

Primary Examiner—L. T. Hix
Assistant Examiner—D. Rutledge
Attorney, Agent, or Firm—Lahive & Cockfield

[57] ABSTRACT

An apparatus and method for changing the optical and/or physical properties of a fluid composition employ an electric field applied across the fluid for controlling the fluid properties. The fluid consists of a dielectric liquid and an electrically conductive, elongated, fibrous particulate material. The fibrous material has a length between approximately 1000 angstroms and five millimeters, a diameter less than about 700 angstroms, and an aspect ratio of length to diameter greater than about five. The particulate material is in colloidal suspension in the liquid. Generally, when the particles are dispersed in the liquid by Brownian movement forces, the fluid composition has an average separation between particles of approximately three to ten or more times the average length of the particulate material. By varying the direction and/or intensity of the applied electric field, the properties of the fluid to both incident light passing therethrough and, with respect to properties such as viscosity, can be controlled and varied. Relatively low electric fields can be employed, for example, between about 100 and 2,000 volts per centimeter.

23 Claims, 1 Drawing Sheet

METHOD AND APPARATUS FOR ELECTRICALLY ALTERING PROPERTIES OF A COLLOIDAL SUSPENSION CONTAINING ELONGATED FIBROUS PARTICLES

BACKGROUND OF THE INVENTION

The invention relates generally to electrically controlling selected properties of a fluid and in particular, to a method and apparatus for electrically controlling selected properties of a colloidal suspension containing elongated fibrous particles.

It is well known that various properties of fluid compositions can be controlled by the application of external electromagnetic fields across the fluid. Thus, for example, electric fields can be applied across liquid crystals for changing their optical properties. Also, ferrofluidic preparations can have a varying viscosity upon the application of selected magnetic fields. Similarly, in accordance with the so-called Winslow effect, a dielectric fluid containing selected, small particles of a given density (often called an "electroviscous" fluid) will, upon the application of an electrical field, take on different viscous properties. The Winslow fluids are typically liquid dielectrics containing electrically conducting or electrically non-conducting, particles of substantially spherical shape. Apparatus employing the Winslow effect has been proposed for use in and with alternating-field chucking devices. And, similarly, ferrofluidics has found substantial use in clutching apparatus and in other fields.

Many workers in the field have used electroviscous fluid compositions because the electrical field can be easily applied across a fluid. This is contrast to the relative difficulty of applying magnetic fields of substantial strength across the fluid. Such magnetic fields require relatively large electric currents and substantial electrical circuits (for example large coil windings) for effecting the proper response in the fluid. Nevertheless, the results using electroviscous fluids have not been satisfactory.

Among the problems found in connection with the Winslow-type electroviscous fluids have been short shelf life and excessive sensitivity to heat. While efforts have been undertaken by some workers in the field to both provide a longer shelf life and less sensitivity to heat, there remain problems using fluids having a high density of particles.

Thus, while electromagnetic field response fluids have been used in many mechanical applications, electroviscous fluids have not been commercially successful. Further, there have not been proposed other advantageous uses of such electric field response fluids, for example, in the optical areas.

Accordingly, therefore, a primary object of the invention is the application of electromagnetic field response fluids to the control of electromagnetic radiation in wavelengths from the visible to the microwave regions of the electromagnetic spectrum. Other objects of the invention are a method and apparatus for controlling properties of a fluid for affecting mechanical and electromagnetic properties of the fluid. Further objects of the invention are a method and apparatus for affecting the mechanical and optical properties of a fluid by applying easily generated electrical fields across the fluid. Yet another object of the invention is a method and apparatus which is easy to implement and control for changing the mechanical and optical properties of a fluid, which are reliable, and which provide both mechanical and optical control states within the fluid in response to an applied electrical field.

SUMMARY OF THE INVENTION

The invention relates to an apparatus for controlling the response of a fluid composition to mechanical and electromagnetic inputs. The fluid composition responds to an applied electric field for changing, for example, its viscosity, or for effecting a selected response to incident electromagnetic energy.

In a particular aspect, the invention features an apparatus and method for altering, for example, by polarizing, amplitude modulating, or phase shifting, an incident beam of electromagnetic energy. The energy is in the spectral band from the visible to and including microwave energy. The apparatus features a fluid composition of a dielectric liquid and a selected density of electrically conductive, elongate fibrous particulate material having a length between approximately 1,000 angstroms and five millimeters, and a diameter between about 200 and 700 angstroms. The fibers have an aspect ratio of length to diameter greater than five. The fluid composition thereby formed is a colloidal suspension and the particulate material will typically have an average separation of approximately five to twenty times the average length of the particle. The apparatus further features circuitry and mechanical structure for applying an electric field across the fluid in a selected direction and intensity for effecting a selected alignment of the fibrous material in the fluid and for thereby, for example, effecting polarization of the beam of electromagnetic energy passing therethrough.

In another aspect, the invention relates to a method and apparatus for altering a property of a fluid composition. The apparatus and method feature applying an electric field across the fluid composition in a selected direction and intensity for effecting a selected alignment of elongated, fibrous material in the fluid for controlling the property of the fluid. The fluid composition consists of a dielectric liquid and an electrically conductive, elongated, fibrous particulate material. The particulate material has a length between approximately 1,000 angstroms and five millimeters, a diameter less than about 700 angstroms, and preferably about 300 angstroms, and an aspect ratio of length to diameter greater than about five. The particulate material is in a colloidal suspension in the liquid under these circumstances. In a particular embodiment, the electric field across the fluid has an intensity of between about 100 and 2,000 volts per centimeter.

BRIEF DESCRIPTION OF THE DRAWINGS

Other objects, features, and advantages of the invention will appear from the following description of particular embodiments taken together with the drawings in which.

DESCRIPTION OF PARTICULAR PREFERRED EMBODIMENTS

Figure 1:
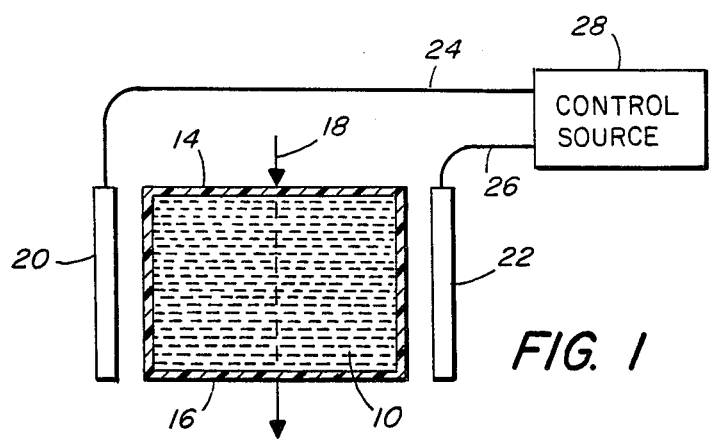
FIG. 1 is a schematic representation of an apparatus for altering an incident electromagnetic beam in accordance with the invention.

Referring to FIG. 1, a fluid system 8 has a fluid composition 10 contained in a container or enclosure 12. The container 12 has optically transparent sides 14 and 16 through which an incident beam 18 of electromagnetic energy passes. The container 12 is preferably constructed of an electrically non-conducting material. A first and a second electrical electrode 20, 22 connect through wires 24, 26 to an electrical control source 28. Electrodes 20, 22 are placed in opposed juxaposition to the sides 14, 16 respectively of container 12. In accordance with the invention, when the electrical control source provides an electric potential difference between electrodes 20 and 22, an electric field is generated across the fluid. The fluid composition 12 responds thereto by effecting, for example, a polarization, modulation, or phase shift of the incident beam 18 of electromagnetic energy passing therethrough.

The fluid composition 12 is typically an electrically insulating fluid containing a suspension of elongated fibrous particles. The fibrous particles are typically between 1,000 angstroms and five millimeters in length and have a diameter of typically between 200 and 700 angstroms. The particles have an aspect ratio of diameter to length greater than five and preferably between about 10,000 and five. The resulting fluid composition is a colloidal suspension and the particles are small enough so that Brownian movement forces will keep them apart. Typically, the particles will be approximately three to ten or more particle lengths apart. Thus, the fluid composition contains thin fibrous particles and does not have a dense "loading."

The particles can be, for example, composed of graphite and are electrically conducting along their length. The fibrous particles can also have an intercalated structure, manufactured by chemical vapor deposition, as described in Dresselhaus, Goldberg, and Spain, "Small, Needle-Shaped Filaments Based on Carbon," presented at the 1985 Proceedings of the 1985 Scientific Conference on Obscuration and Aerosol Research, U.S. Army Chemical Research and Development Center, Aberdeen Proving Grounds, Edgewood Arsenal, Md., attached hereto as Appendix A. When an electric field is applied on the fluid by the control source 28, a torque is exerted on the particles which tends to rotate them into alignment with the field. It is highly desirable, with regard both to the moment of torque resulting from an applied electric field, and to the electromagnetic properties of the fluid composition, according to the invention, that the particles be electrically conductive. It should be noted however, that the electromagnetic properties of the composition are dependent not only on the particle electrical conductivity, but upon particle length and diameter as well. Thus, the particle composition can be conductive, for example, graphite has a conductivity greater than 1000 mhos per meter, or a conductive coating can be applied to an otherwise insulating particle. The particles can also be coated on their outer surface with a material, such as teflon, to reduce the tendency to coagulate in the liquid.

The fluid is preferably a low viscosity fluid which is not electrically conducting, such as, for example, kerosene or benzene. Typically, the field is on the order of between 100 and 2,000 volts per centimeter, and it is expected that the fluid mixture can have a response of up to about 100 kilohertz.

Thus, in accordance with the invention, different optical properties of the solution can be affected by application of an electrical field thereacross. For example, the optical absorbency of the fluid can be controlled by application of the electrical field. In particular, a fluid system such as that of FIG. 1 can be employed to amplitude modulate an incoming electromagnetic wave, polarize the wave, effect phase shifting of the wave, or provide other optical control of an incoming beam of electromagnetic energy over a spectral wave band extending from the visible (5,000 angstroms) to the microwave (ten centimeters) or more.

As shown in Pedersen et al, "Absorption and Scattering by Conductive Fibers: Basic Theory and Comparison with Asymptotic Results," presented at the 1985 Proceedings of the 1985 Scientific Conference on Obscuration and Aerosol Research, U.S. Army Chemical Research and Development Center, Aberdeen Proving Grounds, Edgewood Arsenal, Md., attached hereto as Appendix B, scattering and absorption are a function of the radius, length, electrical conductivity, and incident wavelength. Thus, different properties of the fluid composition, according to the invention, can be achieved by altering the electrical conductivity, the length, and the diameter of the particles. For example, when incident radiation having a wavelength of one centimeter is directed into a fluid composition containing particles having a radius of one micron and a length of one millimeter, a high conductivity (greater than about $10^7$ mhos per meter) has a predominant effect of shifting the phase of the incoming electromagnetic energy. Changing the conductivity to between $10^4$ and $10^5$ mhos per meter causes energy absorption to be the predominant effect within the fluid composition. Accordingly, therefore, the fluid dielectric constant looks like a tensor which can be changed, as desired, to effect phase shift or absorbency of the incident energy.

In another example, a fluid containing particles having a radius of 100 angstroms, a length of twenty microns, and an electrical conductivity of $10^6$ mhos per meter, absorbs incident radiation having a wavelength of 100 microns. Accordingly, different conductivities, lengths, and radii can be employed to alter different properties of the incoming electromagnetic radiation at selected wavelengths. Further, the fluid medium can be made broadband or reasonably narrow band, wherein the wavelength is selectable. Different conductivities can also affect the mechanical response of the fiber particles, as noted above, to an applied electric field.

The energy component of the incident radiation which is absorbed is that component which is parallel to the fiber axis. Energy components perpendicular to the fiber axis are not substantially affected. Accordingly, referring to FIG. 2, two fluid systems 40, 42 each have a fluid composition 44, 46 contained in a container or enclosure 48, 50 respectively. The containers have optically transparent top and bottom sides for allowing incident beams 54, 56 of electromagnetic energy to pass therethrough into the fluid. The beam 56 corresponds to that energy exiting through the bottom of container 44. While shown separately, the containers 48 and 50 can be abutting or otherwise closely spaced to each other along their optically transparent bottom and top surfaces respectively. The systems 40, 42 need not contain the same fluid compositions, and more than two fluid systems can be employed, as needed.

Each container is surrounded by two sets of electrodes, arbitrarily designated the X electrodes 60, 62 and 64, 66 respectively, and the Y electrodes 68, 70 and 72, 74 respectively. In accordance with this embodiment, a control source 76, connecting to all of the electrode pairs over lines 78 by wire connections (not shown), enables selected modulation, polarization, and phase shift control over the incident radiation 54. Thus, the incident beam 54 can be polarized, phase shifted, or amplitude modulated in a variety of ways by the structure of FIG. 2. For example, in one embodiment, electrode pairs 60, 62 along the X axis, and pairs 72, 74 along the Y axis, can be biased to effectively absorb all of the energy in the wave. On the other hand, depending upon particle parameters and incident wavelength, by changing the potentials applied to the electrode pairs, different polarizations, modulations, and phase shifts can be effected. For example, a band limited amplitude modulation can be applied to the input beam of FIG. 2, a circular polarization can be imparted to the incoming radiation, or a phase lag can be effected by either of the systems 40 or 42 by controlling the voltages on an electrode pair, for example, to retard the phase in that direction.

Figure 3:
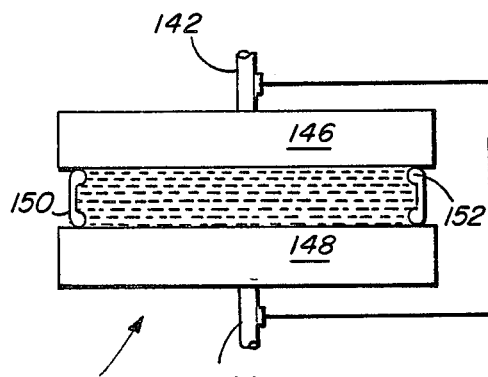
FIG. 3 is a schematic representation of a clutch apparatus in accordance with the invention.

In another application of the invention, a fluid composition such as that described in connection with FIG. 1 can be embodied in a clutch mechanism 140. Referring to FIG. 3, the clutch mechanism 140 has a pair of rotating power transfer shafts 142, 144 which connect to juxtaposed clutch discs 146, 148. The clutch discs are preferably electrically conducting and have sandwiched between them an energy transmitting fluid composition 150 which is sealed therein by an electrically non-conductive ring sealing structure 152. In accordance with the invention, an electrical control source 154 connects to the oppositely oriented discs 146, 148, for example via shafts 142, 144, respectively, and can thereby create an electric field across the fluid 150. In response to the electric field, the viscosity of the fluid changes to provide a better energy transmitting fluid system for transferring power from one rotating clutch disc member to the other.

The fluid composition 50 can consist, for example, of a more viscous dielectric liquid such as a high temperature transmission fluid, and can have therein the electrically conductive graphite elongated particles used in connection with the embodiment of FIG. 1. In a particular embodiment, the particles can have a length of 2,000 angstroms, and a diameter of 200 angstroms and should be as conductive as possible.

Figure 2:
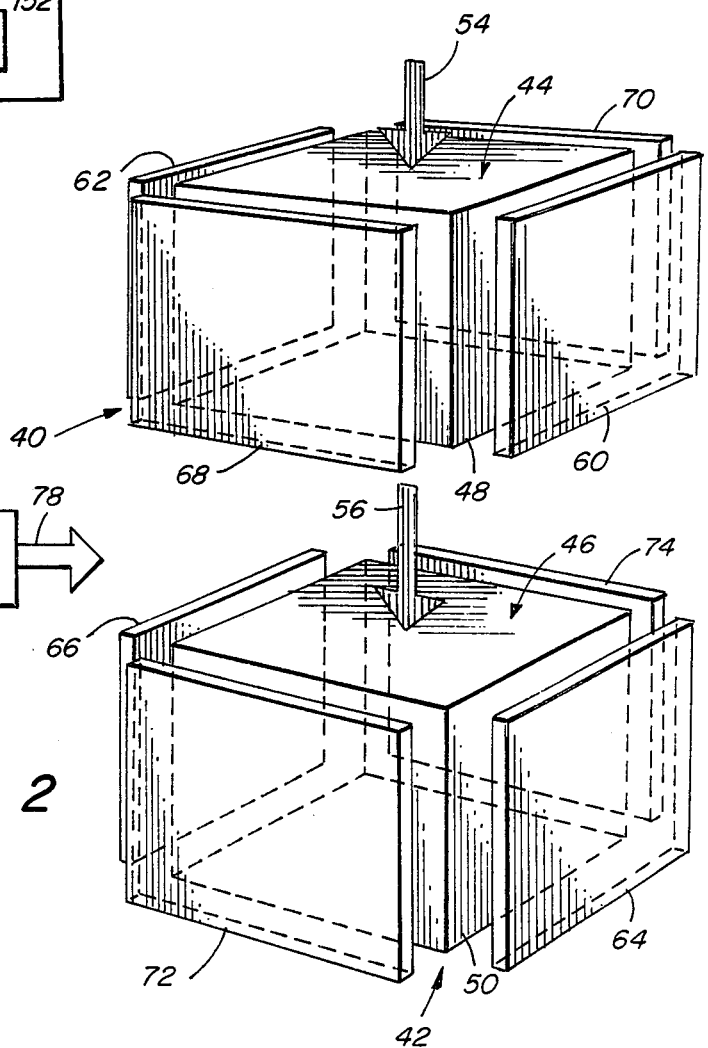
FIG. 2 is a schematic representation of another embodiment of an apparatus for altering an incident electromagnetic beam in accordance with the invention.

Further, in accordance with the invention, the structures of FIGS. 1, 2, and 3, in place of graphite fibers, can use other materials, for example, elongated particulate manufactured from the acetylene compounds. These materials, if necessary, can be conductively coated to provide the required electrical conductivity properties.

The structures of FIGS. 1, 2, and 3 can also be employed in connection with acoustic waves to operate as an acoustic phase shift apparatus (analogous to the optical phase shift), to attenuate an acoustical wave, and to operate as an acoustic transducer. The acoustic transducer operates in a structure similar to the environment of FIG. 3. Operating as an acoustic transducer, movement of the fiber particles, under the influence of an applied electric field, causes movement of the fluid to create an acoustic wave therein. Alternatively, the FIG. 1 structure can be employed to provide an acoustic phase shift or acoustic attenuation. In accordance with this aspect of the invention, the parameters of the fluid system include the relative densities of the fluid and the particles as well as the sound speed of the acoustic wave in the fluid and the particles. When the relative densities of the fluid and the particles are substantially equal, but the sound speeds are different, the configuration of FIG. 1 can act to effect an acoustic phase shift upon an acoustic wave passing therethrough. In particular, if the sound speed in the fluid is less than the sound speed in the particle, a phase advance occurs, while if the sound speed in the fluid is greater than the sound speed in the particle a phase retardation occurs. In this embodiment, the applied electric field causes alignment of the particles at a selected angle to the direction of acoustic wave propagation and thereby provides control over the amount of phase shift. In effect, then, the acoustic refractive index becomes a tensor. Further, in the absence of an electric field, the fluid composition still provides an overall phase shift which can be readily determined, for example, by experimentation.

If the speed of sound in both the fluid and the particle are substantially identical, then selected attenuation occurs when the densities of the fluid and the particle are different. A maximum attenuation occurs when the particles are oriented along a direction normal to the direction of propagation of the acoustic signal. In accordance with this embodiment, therefore, the alignment of the particles, in response to an applied electric field, normal to, parallel to, or at an angle to the propagation direction, effects a selected attentuation of the acoustic signal without effecting a phase shift thereof.

In connection with the acoustic transducer embodiment corresponding to FIG. 3, it is preferred that the particles are biased into alignment at an angle approximately 45° to the "x" and "y" axes of the applied eletric field. In this manner, deviations from the 45° alignment effected by varying the applied electric field cause the particles to change their orientation in a known and predetermined manner. The resulting transducer action, effected by particle rotational movement, is proportional to the first derivative of the angle of the applied electric field relative to, for example, the 45° bias axis about which the field varies.

In yet other applications in accordance with the invention, the elongated fibers can be aligned in a multilayer solid members, for example, for use as solar filters, which can be employed in providing insulating window glass thereby allowing light and heat to enter but preventing their transmittance in the opposite direction. In an alternate embodiment, two solid planar members can be constructed and can be rotated relative to one another to selectively alternate incoming electromagnetic energy.

Additions, subtractions, deletions, and other modifications of the described particular embodiments of the invention will be obvious to those practiced in the art and are within the scope of the following claims.

What is claimed is:
1. Apparatus for polarizing an incident beam of electromagnetic energy, said energy having a spectral bandwidth in the range from visible light to the microwave region, said apparatus comprising a fluid composition containing a dielectric liquid and an electrically conductive, elongated, fibrous particulate material having a length between approximately 1000 angstroms and five millimeters, a diameter less than about 700 angstroms, and an aspect ratio of length to diameter greater than five, said particulate material being in colloidal suspension in said liquid, means for containing said fluid, and means for applying an electric field across the fluid in a selected direction and intensity for effecting a selected alignment of said fibrous material in said fluid for effecting polarization of said incident beam passing therethrough.

2. The apparatus of claim 1 wherein said applying means generates an electric field in said fluid of between 100 and 2,000 volts per centimeter.

3. The apparatus of claim 1 wherein said fibrous material comprises cylindrically shaped graphite fibers having an average separation in said liquid of approximately three to ten times the average length of said material.

4. A method for polarizing an incident beam of electromagnetic energy, the energy having a spectral bandwidth in the range from the visible wavelength to the microwave wavelength, the method comprising the steps of containing a fluid composition containing a dielectric liquid and an electrically conductive, elongated, fibrous particulate material, said material having a length between approximately 1000 angstroms and five millimeters, a diameter less than about 700 angstroms, and an aspect ratio of diameter to length greater than five, said particulate material being in colloidal suspension in said liquid, and applying an electric field across the fluid in a selected direction and intensity for effecting a selected alignment of said fibrous material in said fluid for polarizing the incident beam passing therethrough.

5. The method of claim 4 wherein said applying step comprises the step of generating an electric field of between 100 and 2,000 volts per centimeter in said fluid, said material having an average separation in said liquid of approximately three to ten times the average length of said material.

6. Apparatus for modulating an incident beam of electromagnetic energy, said energy having a spectral distribution substantially in the range from visible light to the microwave region, said apparatus comprising a fluid composition containing a dielectric liquid and an electrically conductive, elongated, fibrous particulate material having a length between approximately 1000 angstroms and five millimeters, a diameter less than 700 angstroms, and an aspect ratio of diameter to length greater than five, said particulate material being in colloidal suspension in said liquid, means for containing said fluid, and means for applying a modulating electric field across the field in a selected orientation for effecting a selected alignment of the fibrous material in the fluid whereby modulation of the incident beam of energy passing through the fluid results.

7. The apparatus of claim 6 wherein said applying means generates an electric field having a peak intensity of between 100 and 2,000 volts per centimeter in said fluid.

8. The apparatus of claim 6 wherein said fibrous material comprises cylindrically shaped graphite fibers having an average separation in said liquid of approximately three to ten times the average length of said material.

9. A method for modulating an incident beam of electromagnetic energy, said energy having a spectral bandwidth in the range from visible light to the microwave, said method comprising the steps of containing a fluid composition composed of a dielectric liquid and an electrically conductive, elongated, fibrous particulate material having a length between approximately 1000 angstroms and five millimeters, a diameter less than about 700 angstroms, and an aspect ratio of length to diameter greater than five, said particulate material being in colloidal suspension in said liquid, and applying a varying electric field across the fluid in a selected orientation for effecting an alignment of said fibrous material in said fluid for effecting modulation of the incident beam of energy passing through the fluid.

10. The method of claim 9 wherein said applying step comprises the step of generating an electric field having a peak intensity in said fluid of between 100 and 2,000 volts per centimeter.

11. A method for transducing an electrical signal into an acoustic wave in a fluid composition comprising the steps of applying a varying electric field across the fluid composition for effecting selected movement of fibrous material in said fluid, said acoustic wave representing a first derivative, as a function of time, of the direction of said applied electric field, and said fluid containing a dielectric liquid and an electrically conductive, elongated, fibrous particulate material having a length between approximately 1000 angstroms and five millimeters, a diameter less than about 700 angstroms, and an aspect ratio of length to diameter greater than five, said particulate material being in colloidal suspension in said liquid.

12. A method for altering the transmission characteristics of acoustic waves traveling in a first direction through a fluid composition comprising the steps of, preparing said fluid composition with a dielectric liquid and an electrically conductive, elongated, fibrous particulate material having a length between approximately 1000 angstroms and five millimeters, a diameter less than about 700 angstroms, and an aspect ratio of length to diameter greater than five, said particulate material being in colloidal suspension in said liquid, and applying an electric field across said fluid composition in a selected direction for effecting a selected parallel alignment of fibrous material in said fluid.

13. The method of claim 12 wherein said applying step comprises the step of generating an electric field in said fluid of between about 100 and 2,000 volts per centimeter, and said particulate material having an average separation in said liquid of approximately three to ten times the average length of said material.

14. A method for introducing a phase shift upon acoustic waves traveling through a fluid composition in a first direction, said fluid containing a dielectric liquid and an electrically conductive, elongated, fibrous particulate material having a length between approximately 1000 angstroms and five millimeters, a diameter less than about 700 angstroms, and an aspect ratio of length to diameter greater than five, comprising the steps of, selecting said dielectric liquid and said particulate material such that they have equal densities but differing sound speeds, and applying an electric field across the fluid in a selected direction relative to said first direction for effecting a selected parallel alignment of fibrous material in said fluid, said parallel alignment being selected to control the amount of phase shift introduced by controlling the angle of alignment with respect to said first direction.

15. A method in accordance with claim 14 wherein said dielectric liquid and particulate material are selected such that the sound speed in said dielectric liquid is less than the sound speed in said particulate material, thereby producing a phase advance on said acoustic waves.

16. A method in accordance with claim 14 wherein said dielectric liquid and said particulate material are selected such that the sound speed in said dielectric liquid is greater than the sound speed in said particulate material thereby producing a phase retardation on said acoustic waves.

17. A method for attenuating acoustic waves traveling through a fluid composition in a first direction, said fluid containing a dielectric liquid and an electrically conductive, elongated, fibrous particulate material having a length between approximately 1,000 angstroms and five millimeters, a diameter less than about 700 angstroms, and an aspect ratio of length to diameter greater than five, comprising the steps of, selecting said dielectric liquid and particulate material such that they have equal sound speeds but differing densities, applying an electric field across the fluid in a selected direction relative to said first direction for effecting a selected parallel alignment of fibrous material in said fluid, said parallel alignment being selected to control the amount of attenuation introduced by controlling the angle of alignment with respect to said first direction.

18. Apparatus for altering the transmission characteristics of acoustic waves traveling through a fluid composition in a first direction comprising, a container enclosing a fluid composition, said fluid composition comprising, a dielectric liquid and an electrically conductive, elongated, fibrous particulate material, said material having a length between approximately 1000 angstroms and five millimeters, a diameter less than about 700 angstroms, and an aspect ratio of length to diameter greater than five, and said particulate material being in colloidal suspension in said liquid, and means for applying an electric field across the fluid composition in a selected direction and intensity for effecting a selected alignment of elongated fibrous material in said fluid for controlling said transmission characteristics of acoustic waves in said fluid.

19. The apparatus of claim 18 wherein said applying means generates an electric field in said fluid of between about 100 and 2,000 volts per centimeter.

20. The apparatus of claim 18 wherein said fibrous material comprises cylindrically shaped graphite fibers having an average separation in said liquid of approximately three to ten times the average length of said material.

21. The apparatus of claim 18 wherein said dielectric liquid and said particles have substantially equal densities and different sound speeds, whereby a selected acoustic phase shift can be imparted to an acoustic wave traveling through said fluid.

22. The apparatus of claim 18 wherein said dielectric liquid and said particles have substantially equal sound speeds and different densities, whereby a selected absorption can be imparted to an acoustic wave traveling through the fluid.

23. The apparatus of claim 18 wherein said applying means applies said electric field for causing movement of said liquid in response to said alignment movement of said particles, whereby said electric field energy is, at least in part, transduced into acoustic energy.

* * * * *